US011297229B2

(12) United States Patent
Perazio et al.

(10) Patent No.: US 11,297,229 B2
(45) Date of Patent: Apr. 5, 2022

(54) METHOD OF ACQUIRING IMAGES AT A PLURALITY OF ACQUISITION LOCATIONS OF AN ACQUISITION DEVICE

(71) Applicant: SOLETANCHE FREYSSINET, Rueil Malmaison (FR)

(72) Inventors: Guy Perazio, Saint-Romans (FR); Jose Peral, Moirans (FR); Serge Valcke, Apprieu (FR); Luc Chambaud, Moirans (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 345 days.

(21) Appl. No.: 16/591,951

(22) Filed: Oct. 3, 2019

(65) Prior Publication Data
US 2020/0112672 A1 Apr. 9, 2020

(30) Foreign Application Priority Data

Oct. 3, 2018 (FR) ..................................... 18 59190

(51) Int. Cl.
*H04N 5/232* (2006.01)
*G06T 7/593* (2017.01)
(Continued)

(52) U.S. Cl.
CPC ......... *H04N 5/23232* (2013.01); *G06T 7/593* (2017.01); *G06T 17/00* (2013.01);
(Continued)

(58) Field of Classification Search
CPC ........... H04N 5/23232; H04N 5/23299; H04N 5/247; G06T 7/593; G06T 17/00;
(Continued)

(56) References Cited

U.S. PATENT DOCUMENTS 9,137,511 B1 * 9/2015 LeGrand, III ..... G01B 11/2545
9,185,290 B1 11/2015 Lapstun et al.
(Continued)

OTHER PUBLICATIONS

French Preliminary Search Report dated Aug. 21, 2019 in French Application 18 59190 filed on Oct. 3, 2018 (with English Translation of Categories of Cited Documents).

*Primary Examiner* — Maurice L. McDowell, Jr.
(74) *Attorney, Agent, or Firm* — Oblon, McClelland, Maier & Neustadt, L.L.P.

(57) ABSTRACT

A method of acquiring images includes moving, into a plurality of acquisition locations, of an acquisition device including at least one camera, and acquisition at each acquisition location of at least one image of a scene by the camera. Each acquisition location being chosen in such a manner that scenes viewed by the camera at two consecutive acquisition locations and corresponding images overlap, at least partially, and areal density of pixels assigned to at least one element of the corresponding scene, which is represented in the corresponding image by a high-resolution portion, is greater than 50% or greater than 80% of a target areal density, the areal density of pixels being defined as a ratio of the area of the element projected in a plane perpendicular to an optical axis of the camera over a quantity of pixels of the high-resolution portion.

15 Claims, 2 Drawing Sheets

Figure 1:
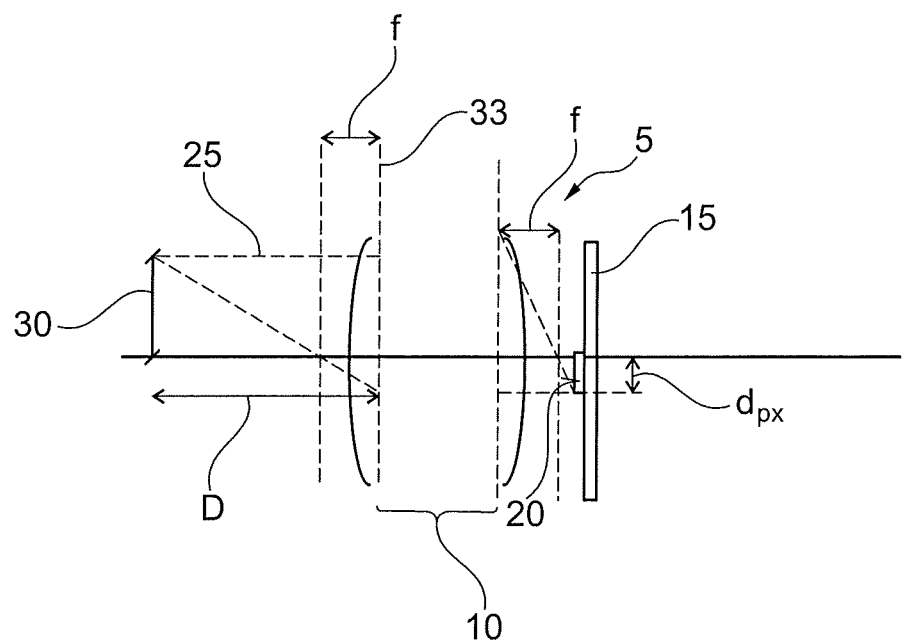

(51) Int. Cl.
*G06T 17/00* (2006.01)
*H04N 5/247* (2006.01)

(52) U.S. Cl.
CPC ......... *H04N 5/23299* (2018.08); *H04N 5/247* (2013.01); *G06T 2210/36* (2013.01)

(58) Field of Classification Search
CPC ....... G06T 2210/36; G06T 2207/10152; G06T 7/521; G01C 11/02
See application file for complete search history.

(56) References Cited

U.S. PATENT DOCUMENTS

| | | | |
|---|---|---|---|
| 2005/0259158 A1* | 11/2005 | Jacob | H04N 5/3456 348/218.1 |
| 2009/0323121 A1* | 12/2009 | Valkenburg | G01C 15/002 358/1.18 |
| 2010/0013927 A1 | 1/2010 | Nixon | |
| 2010/0295855 A1 | 11/2010 | Sasakawa et al. | |
| 2013/0235199 A1 | 9/2013 | Nixon | |
| 2015/0381968 A1* | 12/2015 | Arora | G06T 17/00 348/47 |
| 2016/0057345 A1 | 2/2016 | Lapstun et al. | |
| 2019/0385361 A1* | 12/2019 | Siddiqui | G06T 17/05 |

\* cited by examiner

METHOD OF ACQUIRING IMAGES AT A PLURALITY OF ACQUISITION LOCATIONS OF AN ACQUISITION DEVICE

The invention relates to a method for acquisition of images of scenes of an environment and a method for constructing a 3D digital model from the images.

In order to display a digital model of a scene including a set of real 3D objects, for example on a screen or by means of an augmented reality helmet, a known solution is to construct a cloud of points which discretize the outer envelope of each of the objects.

For this purpose, a known method consists in acquiring images by means of one or more cameras disposed at various acquisition locations and/or in various directions of observation, then in generating the cloud of points from the images, for example by stereoscopy.

The problem associated with this method is that, although it is capable of rendering details of the objects disposed near the camera with a good resolution, those disposed far away are, on the other hand, reproduced with a lower resolution linked to their distance from the camera. Indeed, the resolution of a pixel, which is proportional to the inverse of the dimension of a part of an object which is imaged by a pixel, decreases as the distance between the camera and the object increases. Thus, for a given definition of image, defined as the number of rows and of columns of pixels defining the image, the image may comprise pixels of different resolutions depending on the distance between the camera having acquired the image and the object or objects to be imaged.

Thus, when the 3D digital model is displayed, a user may observe a virtual body, generated for the displaying of the digital model, which may appear to them to be poorly visually detailed, even when virtually going very close to the virtual body, this body representing an object situated far from the camera when the images were acquired.

The invention aims to overcome the drawbacks described hereinabove and, for this purpose, it provides a method of acquiring images comprising the moving, into a plurality of acquisition locations, of an acquisition device comprising at least one camera, and the acquisition, at each acquisition location, of at least one image of a scene by means of the camera, each acquisition location being chosen in such a manner that:
the scenes, viewed by the camera at two consecutive acquisition locations, and the corresponding images are at least partially overlapping, and
the areal density of pixels assigned to at least one element of the corresponding scene, which is represented in the corresponding image by a high-resolution portion, is greater than 50%, preferably greater than 80% of a target areal density, the areal density of pixels being defined as the ratio of the area of the element projected in a plane perpendicular to the optical axis of the camera over the quantity of pixels of the high-resolution portion.

A bank of images comprising images of the acquired scenes can thus advantageously be formed, and it is thus ensured that each image of the bank comprises a high-resolution portion. The acquisition method according to the invention thus renders possible the creation of a 3D model of an environment with a substantially uniform resolution, by basing itself on the high-resolution portions of each image and by putting aside the portions defined with a lower resolution.

When the 3D model is displayed, an observer, who virtually moves between the generated bodies, can thus observe them with substantially the same level of detail.

The high-resolution portion preferably represents more than 20% of the total number of pixels defining the image. It may represent less than 100%, less than 90%, less than 80%, or even less than 50% of the total number of pixels defining the image. The image may comprise a low-resolution portion which represents the complement, in number of pixels of the image, of the high-resolution portion.

The areal density of pixels assigned to the element of the corresponding scene that is represented in the corresponding image by the high-resolution portion may be greater than the target areal density. The areal density of pixels assigned to an element, for example an object, of the scene represented in an image corresponds to the number of pixels representing the element in the image, divided by the area of the element. It may be expressed in $px \cdot mm^{-2}$ [pixels per square millimeter]. For example, in an image having a high-resolution portion in which an object is represented with N pixels, the areal density assigned to the element is N pixels per square millimeter of surface of the element.

The "target areal density" is determined by the operator implementing the acquisition method, for example in a prior step or during the acquisition.

For the sake of being concise, the areal density of pixels assigned to at least one element of the scene, which is represented in the corresponding image by a high-resolution portion, is denoted "areal density of pixels of the high-resolution portion".

A "scene" is a part of an environment that may be observed by an image acquisition device when the latter is immobile at a given acquisition location. A scene may comprise at least one, preferably several, elements, notably an object. The object may be a structure, for example a bridge or a tunnel, a building, a house, a stadium, a ship, a warehouse, an urban infrastructure, for example a bus shelter, an ornamental article, a road sign, a traffic light, a wall, a side for example of a tunnel, or a part of the latter. The object may be a natural element, for example a tree, a rock, a mountain, a wall of a cave.

Furthermore, the operator knows in a routine manner how to determine the acquisition locations in order to ensure that the areal density of pixels of the high-resolution portion is according to the invention.

As illustrated schematically in FIG. 1, a camera 5 comprises a lens 10 and a sensor 15 having photosites 20. Each photosite receives a portion of the radiation 25 coming from an object 30 to be imaged passing through the lens and converts it into information, generally colorimetric data, to be assigned to a corresponding pixel in the image.

The areal density ρ associated with an element of a scene in an image depends on the focal distance f of the lens, on the distance D between the main object plane 33 of the lens of the camera and the element, and on the size $d_{px}$ of the photosite on the sensor of the camera defining a pixel. It is expressed by the following equation (1):

$$\rho = \left[\frac{f}{d_{px}(D-f)}\right]^2 \quad (1)$$

A person skilled in the art can easily determine, knowing the focal length of the objective and the size of the photosite, the areal density associated with an element of a scene, by simply measuring the distance between the element and the acquisition device.

For example, when the main object plane of the camera is disposed at a distance D equal to 5 m from the nearest object of a scene, for a size of photosite $d_{px}=1$ µm and for a focal distance of the camera lens of 50 mm, the areal density ρ associated with the object is around 102 px·mm$^{-2}$.

Thus, after having determined an areal density $\rho_{min}$ of a high-resolution portion of an image to be acquired, those skilled in the art know that they have to position the acquisition device with respect to the nearest object in such a manner as to ensure that the distance D fulfills the following condition (2):

$$D \leq f\left(1 + \frac{1}{\sqrt{\rho_{min}} \, d_{px}}\right) \quad (2)$$

In other words, a person skilled in the art, after having chosen the target areal density he wishes to achieve, for example knows the distance, measured between an element of the scene and the acquisition device, below which the element will be represented with an areal density of pixels greater than the target areal density.

The method may therefore comprise, prior to the acquisition of the images, the measurement of the distance between at least one element of the scene to be acquired and the main object plane of the camera lens, and the verification of the condition (2). The measurement is for example carried out by means of a rangefinder, for example using laser sighting, mounted on the acquisition device.

Preferably, the target areal density is greater than or equal to 50 px·mm$^{-2}$ [pixels per square millimeter], preferably greater than or equal to 60 px·mm$^{-2}$, or better in the range between 70 px·mm$^{-2}$ and 100 px·mm$^{-2}$. A 3D model may thus be constructed with a high resolution, notably close to or superior to that which the human eye is capable of detecting. An observer can thus observe in the display of the 3D model the same details as if they were observing the environment, from the same point of view.

The areal density of pixels may be greater than 90%, or better greater than 95% of the target areal density. It may be less than 110%, notably less than 105% of the target areal density.

The scenes viewed by the camera in two consecutive acquisition locations and the corresponding images overlap, at least partially. The overlapping of the images facilitates the discretization of the scenes, notably by photogrammetry. Preferably, the overlap fraction between said images is greater than 70%, or even greater than 80%, for example greater than 90%. The overlap fraction may be calculated:
  optionally, by projecting one of the two images into a plane the normal of which is parallel to the viewing axis of the camera in the position in which the other image has been taken, then
  by matching, for example by correlation of images, the image, optionally projected, and the other acquired image, so as to determine the common area between the image, optionally projected, and the other image, and
  by expressing as percentages the ratio of the number of pixels in the matched area over the number of pixels in the other image.

For example, the projection step described hereinabove is carried out when the angle between the viewing axes of the camera at the consecutive acquisition locations is greater than 5°.

Preferably, the acquisition device comprises a plurality of cameras disposed for acquiring at the same acquisition location respective images which overlap one other. The acquisition device may notably comprise at least two cameras, preferably at least five cameras, preferably at least ten cameras, or better at least fifteen cameras, the cameras each acquiring a corresponding image of the scene along a different viewing axis from the others, the images thus acquired of the same scene overlapping one another. In this way, the construction of the 3D model is facilitated, since these images can be more easily correlated with one another, for example by photogrammetry.

The cameras may be synchronized in such a manner as to acquire images at the same moment. The subsequent processing of the images is thus facilitated.

Preferably, the acquisition device comprises an acquisition module comprising a monopod and at least two acquisition stages disposed at different heights on the monopod, each acquisition stage comprising a plurality of cameras each configured for acquiring an image of the scene, the viewing axes of the cameras of one acquisition stage being angularly distributed around the axis of the monopod such that the acquired images angularly overlap. The monopod may be designed to be carried by an operator moving around in the environment. On the lower part, it may comprise a foot allowing it to be placed on the ground. The device may comprise at least three, preferably three, acquisition stages. The cameras of each stage being distributed around the longitudinal axis of the monopod over a total angular sector in the range between 90° and 120°, preferably in the range between 150° and 190°, in particular equal to 180°. The spacing between the acquisition stages may be adjustable. The cameras of an acquisition stage are preferably fixed with respect to one another. The acquisition module may comprise at least six, preferably at least ten, preferably at least twelve, notably fifteen cameras.

Preferably, the optical adjustments of the camera are identical at at least two, preferably at all, the acquisition locations. In particular, the focusing of the camera may be identical at all the acquisition locations. Preferably, the aperture of the camera lens and the shutter speed of the camera are identical at all the acquisition locations. The differences in contrast and in brightness between images of the same scene acquired at various acquisition points are thus limited.

Preferably, the lighting of the scene has a constant intensity at all the acquisition locations. The colorimetric differences between two overlapping images acquired at various acquisition points are thus reduced, which facilitates their correlation and the creation of the 3D model. The scene or scenes may be lit by means of at least one lamp the color temperature of which is constant, for example in the range between 5000 K and 5500 K. The lamp may include light-emitting diodes.

The camera may acquire a film in continuous mode formed of chronological sequences of images. It may, as a variant, acquire photographic images. For example, the camera may be portable, for example of the GoPro mark. It may be a still photo camera, for example of the reflex type. It may be configured for generating a digital image in a standard image data format, for example chosen from amongst jpeg, png, tiff, raw and bmp, preferably raw, or for generating a film, for example in the standard format chosen from between avi, mpeg and mkv, from which the chronological sequence of images may be extracted.

The images may each comprise more than 1 million, or more than 4 million, or more than 8 million, or better more than 16 million pixels.

The acquisition device may be such as described in the patent application FR 1856591, incorporated here as a reference.

The acquisition method comprises moving the acquisition device in a plurality of acquisition movements.

Moving the acquisition device may be provided by the movement, notably walking, of an operator handling the acquisition device. As a variant, the acquisition device may be moved by means of a vehicle, for example an automobile, or of an aircraft, for example a drone, or of a lifting machine, for example a crane or a winch, on which the acquisition device is mounted.

The consecutive acquisition locations may define a terrestrial path, notably urban. The path may be underground, for example following a network of sewers or tunnels. It may be aerial, for example when the device is mounted on a drone and the images are acquired as a birds-eye view.

Preferably, the scanning device is moved along a path defined by the consecutive acquisition locations, then, starting from the last acquisition location of the path, the scanning device is moved in the direction of the first location of the path, in such a manner as to acquire scenes different from those acquired when following the path. The number of images acquired is thus increased and, as a consequence, the total number of high-resolution portions. Furthermore, even more images of the same element are acquired observed from various acquisition locations according to various points of view. The later processing of the images, for example by photogrammetry, for constructing the 3D model is thus improved. The scenes acquired during the movement in the direction of the first location include, preferably, objects included in the scenes acquired when the path was followed.

The acquisition device is moved between first and last acquisition locations. Preferably, the number of stops between the first and last acquisition locations is less than 10, preferably less than 5. It would be even better for the movement of the acquisition device to be carried out without stopping. Preferably, the scanning device then comprises a camera acquiring a film in the form of a chronological sequence of images. The total duration of the acquisition of the images between the first and last acquisition locations is thus reduced, which thus increases the productivity of the operator implementing the method.

In particular, the average speed of movement of the acquisition device between the first and last acquisition locations may be greater than 0.4 m·s$^{-1}$. It is thus possible to cover a long path in a reduced time.

For example, the method comprises the moving into at least 10 acquisition locations per minute, or at least 60 acquisition locations per minute, or even at least 100 acquisition locations per minute.

The frequency of acquisition of the images during the movement is greater than 0.5 Hz, notably greater than 24 Hz, in particular when the images form a chronological sequence of a film.

The movement may follow a substantially unidirectional path between the first and last acquisition locations. For example, the path may follow the direction of extension of a tunnel. As a variant, the path may comprise numerous changes in direction, for example when the environment extends over a surface. For example, the path may run along a series of streets of a town, oriented in several directions. Within a street, the path may comprise at least one crossing of the road in order to acquire images from opposing sidewalks of the street.

Furthermore, in contrast to the 3D models of the prior art which are generally obtained using the maximum amount of exploitable information contained in the acquired images, the method according to the invention makes available, for the later construction of a 3D digital model, images from which only the high-resolution portions may be used, although such images might comprise other usable information. It is therefore preferable, according to the invention, to acquire a larger number of images and, preferably, at a higher number of acquisition locations, with respect to the number of images needed to implement a method of the prior art.

The path may comprise more than 10 acquisition locations per kilometer, preferably more than 100 acquisition locations per kilometer, or more than 1000 acquisition locations per kilometer, or even more than 10,000 acquisition locations per kilometer, or even better more than 100,000 acquisition locations per kilometer, depending on the length of the path.

The path may comprise more than 10 acquisition locations, preferably more than 100 acquisition locations, even better more than 1000 acquisition locations.

The path may comprise more than 1000 acquisition location per square kilometer, or more than 10,000 acquisition locations per square kilometer, or more than 1 million acquisition locations per square kilometer, or even more than 10 million acquisition locations per square kilometer and the surface area on which the acquisition locations are disposed is greater than 1 m$^2$, or greater than 100 m$^2$, or greater than 1000 m$^2$, or even greater than 1000 m$^2$.

More than 1000 images, preferably more than 10,000 images, or even more than 100,000 images may be acquired between the first and last acquisition locations.

Preferably, the same element, for example the same object, is acquired at least 5 times, or at least 10 times, or even at least 50 times at different acquisition locations. In this way, the number of high-resolution portions representing all or part of the element in the various images is increased.

As has already been described, the method according to the invention produces a bank of images, each of the images comprising a high-resolution portion which may be processed in order to construct a 3D digital model.

Thus, the invention furthermore relates to a method for constructing a 3D digital model representing at least one object, the method comprising:
- the acquisition of a plurality of images between first and last acquisition locations by means of the method according to the invention,
- the selection, for each scene viewed by the camera, of at least one high-resolution portion in at least one corresponding image,
- the construction of a 3D elementary model of each scene viewed by means of at least one corresponding high-resolution portion, and
- the assembly of the 3D elementary models in order to produce the continuous 3D digital model between the first and last acquisition locations.

Preferably, the selection of the high-resolution portion or portions in the corresponding image comprises:
- the recognition in the image, for example by correlation of images, of areas common to the image and to another image overlapping the image at least partially, the other image being acquired by the camera at another acquisition location or being acquired by another camera of the acquisition device at the same acquisition location, the calculation of the distance between the main object plane of the camera such as disposed at the acquisition location of the image and the element or elements of the corresponding scene represented on the common areas of the image, for example according to a stereoscopic calculation algorithm, in such a manner as to determine the areal density of the element or elements of the corresponding scene, and the selection of the portion or portions of the image representing elements of the corresponding scene to which an areal density greater than 50%, preferably greater than 80% of the target areal density is assigned.

The construction of the 3D elementary model preferably comprises the discretization of the scene in the form of a cloud of points. The discretization of the scene is preferably carried out by photogrammetric processing of the high-resolution portions of the images representing elements included in the scene. Preferably, the photogrammetric processing includes the digital correlation of high-resolution portions of several images, for example of the entirety of the images acquired at the corresponding location. It may be carried out using at least two images respectively acquired at consecutive acquisition locations on the path. For example, the photogrammetric processing is implemented by means of the software application PhotoScan published by the company Agisoft. The assembly of the 3D elementary models for producing the continuous 3D digital model may be implemented in the same way.

The continuous 3D model is preferably formed from a cloud of points. A voxel may be defined at each point of the cloud. A voxel is a volume of parallelepipedic, preferably cubic, shape. The size of the voxel corresponds to the diameter of the smallest sphere circumscribed on the voxel. The voxel represents a region of the object represented by one or more pixels in high-resolution portions of images. The size of the voxel depends on the resolution of the corresponding pixels.

The invention lastly relates to a data storage unit comprising a bank of images obtained by the acquisition method according to the invention. The data storage unit may be a hard disk or SSD, a flash memory, for example of a USB stick.

Figure 2:
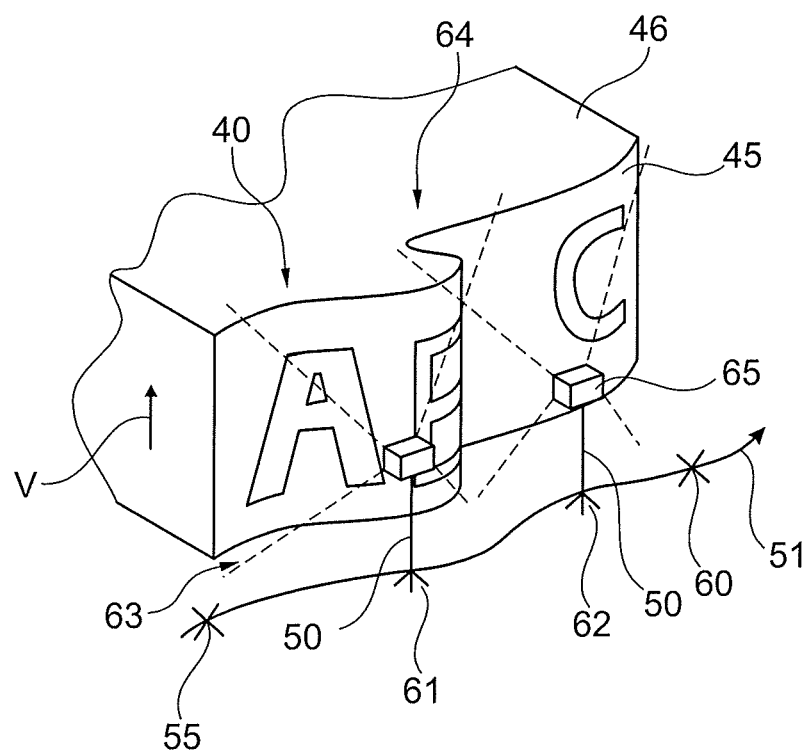
Figure 3:
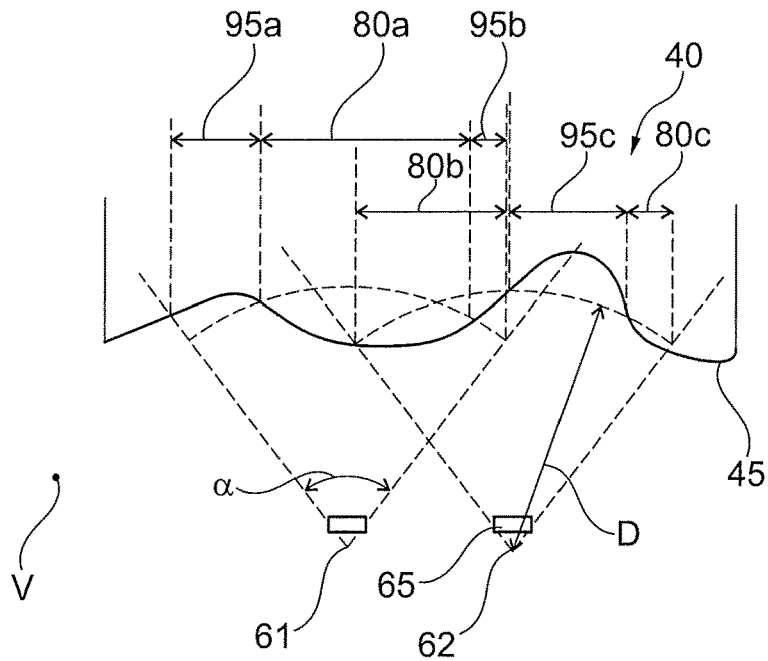
Figure 4:
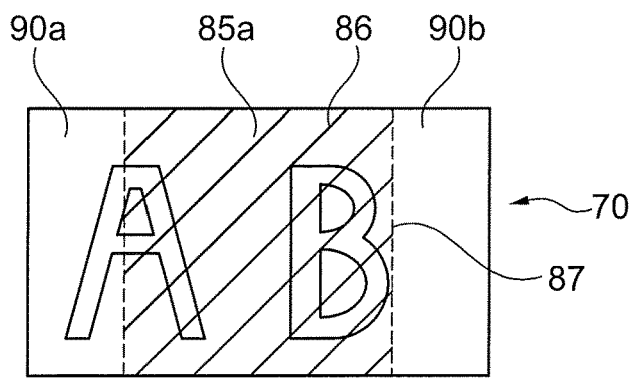
Figure 5:
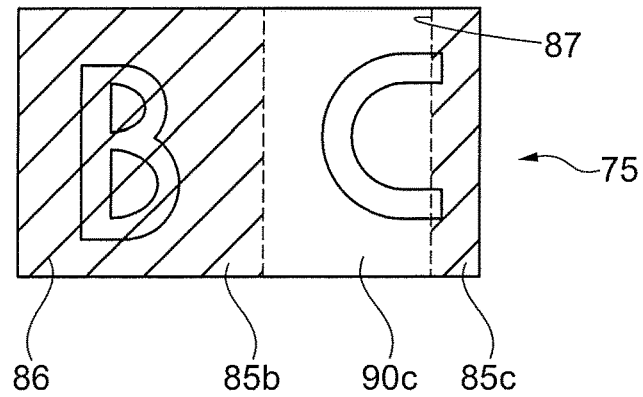

The invention will be better understood upon reading the detailed description that follows of non-limiting examples of implementation of the latter, and upon examining the appended drawing, in which:

FIG. 1 shows schematically an element to be imaged, a lens and a sensor of a camera, FIG. 2 illustrates an environment to be acquired according to a perspective view, FIG. 3 shows a view in the vertical direction V of the environment in FIG. 3, and FIGS. 4 and 5 are images of the scenes of the environment, acquired at various acquisition locations.

FIG. 2 shows, by way of illustration, an environment 40 in which a building 46 is disposed comprising a wall 45. The wall is curved and comprises inscriptions in the form of the letters "A" to "C". The method according to the invention is implemented in order to acquire images of various scenes of the environment.

An acquisition device 50 is positioned along a path the direction of travel of which is shown by the arrow 51 between first 55 and last 60 acquisition locations. For the sake of clarity, only four acquisition locations 55, 60 and 61, 62 are shown in FIG. 2, but the path may comprise a higher number thereof.

The acquisition device preferably comprises several cameras, taking different images of the same scene 63,64. However, for the sake of clarity, the viewing angle α and the images 70, 75 acquired by a single camera 65 are shown.

The acquisition device is positioned in such a manner as to comply with the condition (2) previously described. In this way, at each acquisition location, it is ensured that the images acquired by the device comprise at least one high-resolution portion.

Thus, as observed in FIG. 4, the portions 80a-c of the wall shown in FIG. 3, seen by the camera at each acquisition location, which are disposed at a distance less than or equal to D, are represented in the corresponding images by high-resolution portions 85a-c, shown by the hatched area 86 bounded by dashed lines 87. The other portions 90a-c of the images comprise portions in which the maximum density of pixels is lower than in the portions 80a-c. This is because they correspond to portions 95a-c of the wall situated further away from the camera at the corresponding acquisition location 61, 62.

Subsequently, a continuous 3D digital model of the environment may be generated by means of the high-resolution portions. For example, by means of a photogrammetric processing of the high-resolution portions 85a and 85b, a 3D elementary model of the portion of the wall comprising the letter "B" may be generated.

When the 3D digital model is displayed, for example by means of an augmented reality headset, the observer can virtually move around the modeled region of the wall comprising the letter "B" and observe within it the same level of detail irrespective of the level of observation.

It goes without saying that the image acquisition method may be implemented for acquiring images of an environment more complex than that illustrated in the drawing. The invention is not limited to the embodiments presented hereinabove.

The invention claimed is:

1. A method of acquiring images comprising moving, into a plurality of acquisition locations, of an acquisition device comprising at least one camera, and acquisition at each acquisition location of at least one image of a scene by the camera, each acquisition location being chosen in such a manner that:
scenes viewed by the camera in two consecutive acquisition locations and corresponding images overlap, at least partially, and
areal density of pixels assigned to at least one element of the corresponding scene, which is represented in the corresponding image by a high-resolution portion, is greater than 50% or greater than 80% of a target areal density, the areal density of pixels being defined as a ratio of the area of the element projected in a plane perpendicular to an optical axis of the camera over a quantity of pixels of the high-resolution portion, the target areal density being greater than or equal to 50 px·mm$^{-2}$ (pixels per square millimeter).

2. The method according to claim 1, the target areal density being greater than or equal to 60 px·mm$^{-2}$, or in a range between 70 px·mm$^{-2}$ and 100 px·mm$^{-2}$.

3. The method according to claim 2, wherein focusing of the camera is identical at all the acquisition locations and/or the lighting of the scene has a constant intensity at all the acquisition locations.

4. The method according to claim 1, wherein the acquisition device is moved along a path defined by the consecutive acquisition locations, then, starting from the last acquisition location of the path, the acquisition device is moved in a direction of the first acquisition location of the path, in such a manner as to acquire scenes different from those acquired while following the path.

5. The method according to claim 1, the acquisition device comprising at least two cameras, or at least five cameras, or at least ten cameras, or at least fifteen cameras, the cameras each acquiring an image of the corresponding scene along a viewing axis different from the others, the images thus acquired of a same scene overlapping one another.

6. The method according to claim 1, wherein the acquisition device is moved between first and last acquisition locations, a number of stops between the first and last acquisition locations is less than 10 or less than 5, and the movement of the acquisition device between the first and last acquisition locations is carried out without stopping.

7. The method according to claim 1, wherein the acquisition device is moved along a path defined by the consecutive acquisition locations, the path comprising more than 10 acquisition locations per kilometer, or more than 100 acquisition locations per kilometer, or more than 1000 acquisition locations per kilometer, or even more than 10,000 acquisition locations per kilometer, or even more than 100,000 locations per kilometer, depending on length of the path.

8. The method according to claim 1, wherein the acquisition device is moved along a path defined by the consecutive acquisition locations, the path comprising more than 1000 acquisition location per square kilometer, or more than 10,000 acquisition locations per square kilometer, or more than 1 million acquisition locations per square kilometer, or even more than 10 million acquisition locations per square kilometer and a surface on which the acquisition locations are situated is greater than 1 m$^2$, or greater than 100 m$^2$, or greater than 1000 m$^2$, or greater than 1000 m$^2$.

9. The method according to claim 1, wherein a same element is acquired at least 5 times, or at least 10 times, or at least 50 times at various acquisition locations.

10. The method according to claim 1, wherein an average speed of movement of the acquisition device between the first and last acquisition locations is greater than 0.4 m·s$^{-1}$.

11. The method according to claim 1, further comprising moving into at least 10 acquisition locations per minute, or into at least 60 acquisition locations per minute, or into at least 100 acquisition locations per minute.

12. The method according to claim 1, wherein a frequency of acquisition of the images during the movement is greater than 0.5 Hz or greater than 24 Hz.

13. The method according to claim 1, the high-resolution portion representing more than 20% of the total number of pixels defining the image, or less than 100% of the total number of pixels defining the image.

14. A method for constructing a 3D digital model representing at least one object, comprising
acquisition of a plurality of images between first and last acquisition locations by the method according to claim 1;
selection, for each scene acquired, of at least one high-resolution portion in at least one corresponding image;
construction of a 3D elementary model of each scene acquired by means of the high-resolution portion; and
assembly of the 3D elementary models in order to form the continuous 3D digital model between the first and last acquisition locations.

15. The method according to claim 14, wherein the selection of the high-resolution portion or portions of the image comprises:
recognition in the image, by correlation of images, of areas common to the image and to another image overlapping the image at least partially,
the other image being acquired by the camera at another acquisition location or being acquired by another camera of the acquisition device at the same acquisition location,
calculation of the distance between the main object plane of the camera such as disposed at the acquisition location of the image and the elements of the corresponding scene represented on the common areas of the image, according to a stereoscopic calculation algorithm, so as to determine the areal density of the elements of the corresponding scene, and
selection of the portion or portions of the image representing elements of the corresponding scene to which an areal density greater than 50% or greater than 80%, of the target areal density is assigned.

* * * * *